(12) United States Patent
Ejima (10) Patent No.: US 7,580,525 B1
(45) Date of Patent: Aug. 25, 2009

(54) SUB-SCRAMBLING/DESCRAMBLING METHOD AND SUB-SCRAMBLING/DESCRAMBLING DEVICE

(75) Inventor: Naoki Ejima, Hirakata (JP)

(73) Assignee: Panasonic Corporation (JP)

( * ) Notice: Subject to any disclaimer, the term of this patent is extended or adjusted under 35 U.S.C. 154(b) by 0 days.

(21) Appl. No.: 09/423,930

(22) PCT Filed: Mar. 11, 1999

(86) PCT No.: PCT/JP99/01178

§ 371 (c)(1),
(2), (4) Date: Apr. 13, 2000

(87) PCT Pub. No.: WO99/46885

PCT Pub. Date: Sep. 16, 1999

(30) Foreign Application Priority Data

Mar. 13, 1998 (JP) .................................. 10/062820

(51) Int. Cl.
*H04L 9/00* (2006.01)
*H04N 7/167* (2006.01)

(52) U.S. Cl. ........................................ 380/268; 380/210

(58) Field of Classification Search .................. 380/210, 380/216, 217, 237, 236, 268
See application file for complete search history.

(56) References Cited

U.S. PATENT DOCUMENTS

| | | | | |
|---|---|---|---|---|
| 4,266,243 A | * | 5/1981 | Shutterly | .................... 380/236 |
| 4,304,962 A | * | 12/1981 | Fracassi et al. | ................ 380/42 |
| 4,639,548 A | * | 1/1987 | Oshima et al. | ................. 380/43 |
| 4,742,544 A | * | 5/1988 | Kupnicki et al. | ............. 380/215 |
| 5,793,656 A | * | 8/1998 | Richmond et al. | ........... 708/230 |
| 5,815,331 A | * | 9/1998 | Okamoto et al. | .............. 360/48 |
| 5,956,401 A | * | 9/1999 | Harrison | ..................... 709/224 |

FOREIGN PATENT DOCUMENTS

| | | |
|---|---|---|
| JP | 63-209338 A | 8/1988 |
| JP | 5-56034 A | 3/1993 |
| JP | 05056034 A * | 3/1993 |
| WO | WO 88 05233 A | 7/1988 |
| WO | WO 98 08180 A | 2/1998 |

* cited by examiner

*Primary Examiner*—Brandon S Hoffman
(74) *Attorney, Agent, or Firm*—Rossi, Kimms & McDowell LLP (57) ABSTRACT

A sub-scrambling/descrambling method and device enhances the degree of scrambling of linear PCM data. Data is delimited at predetermined times, and the minimum value of a run is found and used as annex information. The run part is replaced with an arbitrary irreversible random data string, which is processed by a main scrambling device to generate transmission data. After main descrambling of the transmission data, a descrambling device takes out the annex Information and replaces the random data string with a predetermined "0" or "1" run according to the annex information. Thus, the degree of scrambling of linear PCM data is enhanced as much or more than compressed video data.

20 Claims, 12 Drawing Sheets

SUB-SCRAMBLING/DESCRAMBLING METHOD AND SUB-SCRAMBLING/DESCRAMBLING DEVICE

TECHNICAL FIELD

The present invention relates to a method, as well as the device, of scrambling used in a copyright security device or a confidential data transmission; more specifically, a sub-scrambling/descrambing method suitable to transmission of an image data.

BACKGROUND ART

Data may be scrambled in various ways. A major objective of scrambling audio and video signals or other image data is security of rights related to the toll data transmission activities or the right contained in data transmitted thereby. Only the authorized persons licensed by an original author or its agency should be enabled to descramble and read the data transmitted, while it should not be made available to the rest. For protecting the rights related to data, an image data is scrambled before transmission and a key information needed for descrambling the scrambled data is transmitted, or controlled.

Japanese Patent Laid Open Publication No. H7-274166 teaches us a conventional technology. Outline of the conventional technology is described below. A principal aim of the conventional technology is to avoid any increase in the total number of bits when scrambling certain data through the variable length encoding. Therefore, instead of scrambling an input signal data, scrambling is conducted on any one bit of data after they undergo a DCT device, a sampling device, a run length encoder or a motion vector encoder, or a combination thereof. As understood also from the above, it has been a common practice to apply scrambling on compressed and encoded data. It is not desirable to conduct scrambling direct on an input linear PCM data; the data redundancy is lost by the scrambling, which eventually results in a drastic deterioration in the efficiency of compression.

Figure 9:
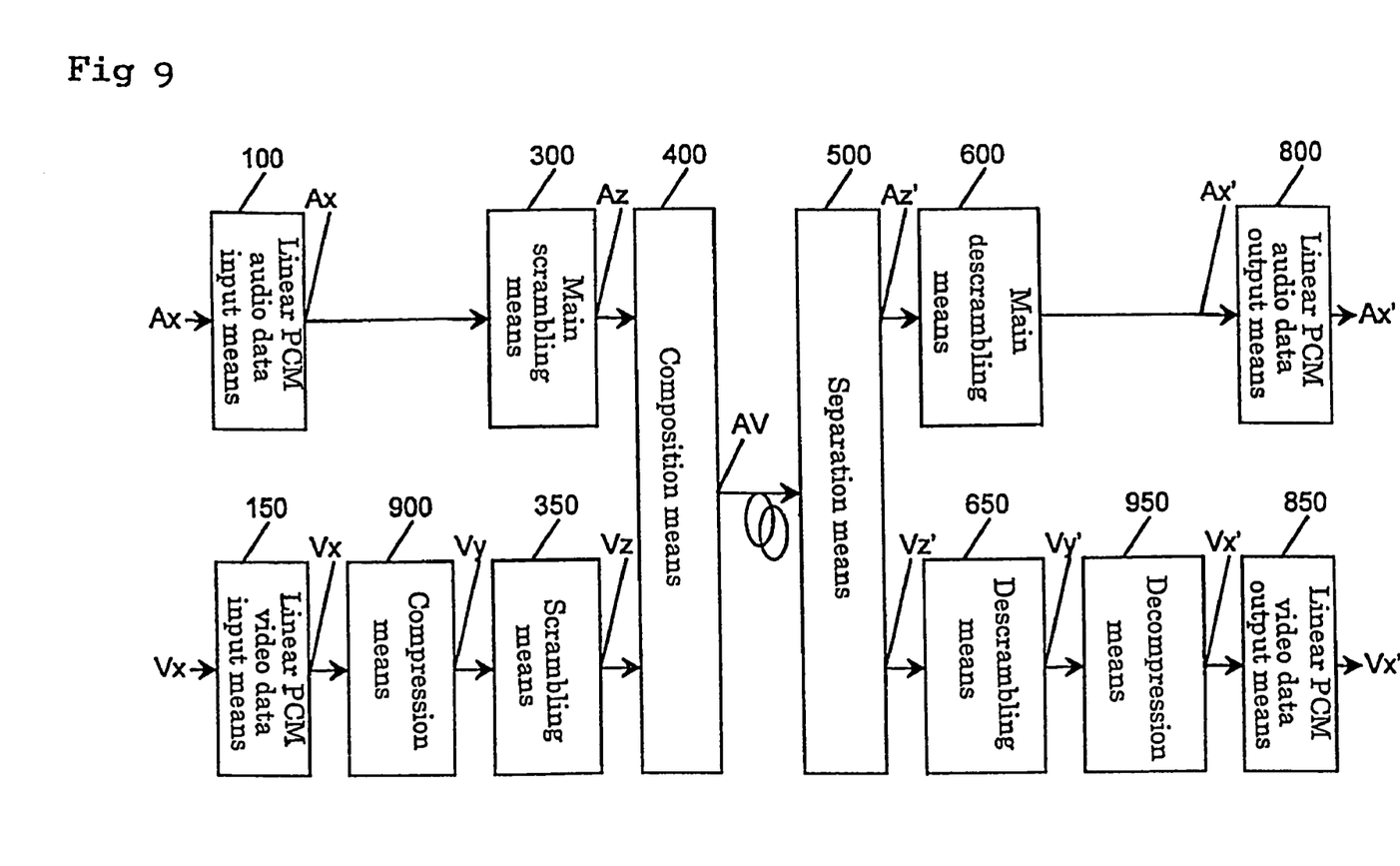
FIG. 9 is a block diagram of a conventional scrambling/descrambling method, and the device, being incorporated in an AV system.

Meanwhile, the recently introduced DVD and other such high density recording media have made it possible to record linear PCM audio data without having them compressed. So, in some of the AV systems that transmit both video data and audio data at the same time, compressed video data and linear PCM audio data operate in combination. The copyright security by scrambling is of course required also in such AV systems of the above operating mode. FIG. 9 shows an exemplary AV system having the above-described operating mode. In FIG. 9, numeral 100 denotes input means for linear PCM audio data, 150 is input means for linear PCM video data, 900 is compression means, 300 and 350 are scramble means, and 400 is composition means. Numeral 500 denotes separation means, 600 and 650 are descrambling means, 800 is output means for linear PCM audio data, 950 is decompression means, and 850 is output means for linear PCM video data.

Audio signal Ax is scrambled by the scramble means 300 to become scrambled audio signal Az. The scrambled audio signal Az is delivered to the composition means 400. Video signal Vx is compressed by the compression means 900 to become compressed video signal Vy, which signal is scrambled by the scramble means 350 to become compressed scrambled video signal Vz. The compressed scrambled video signal Vz is delivered to the composition means 400. The composition means 400 composes these signals to make a composite signal AV. In order to use the same means in common, in the present case, the scrambling means 300 and the scrambling means 350 follow a same scrambling method. The composite signal AV thus produced is recorded in an appropriate medium format, or transmitted.

The composite signal AV recorded, or transmitted, is received at the separation means 500, which signal is separated there into scrambled audio signal Az' and compressed scrambled video signal Vz'. The scrambled audio signal Az' is descrambled at the descrambling means 600 to become descrambled audio signal Ax'. The audio signal Ax' is taken up by the output means 800 for linear PCM audio data. The compressed scrambled video signal Vz' is descrambled at the descrambling means 650 to become compressed video signal Vy', which video signal Vy' is decompressed by the decompression means 950 to be restored to video signal Vx'. The video signal Vx' is taken up by the output means 850 for linear PCM video data.

Figure 10:
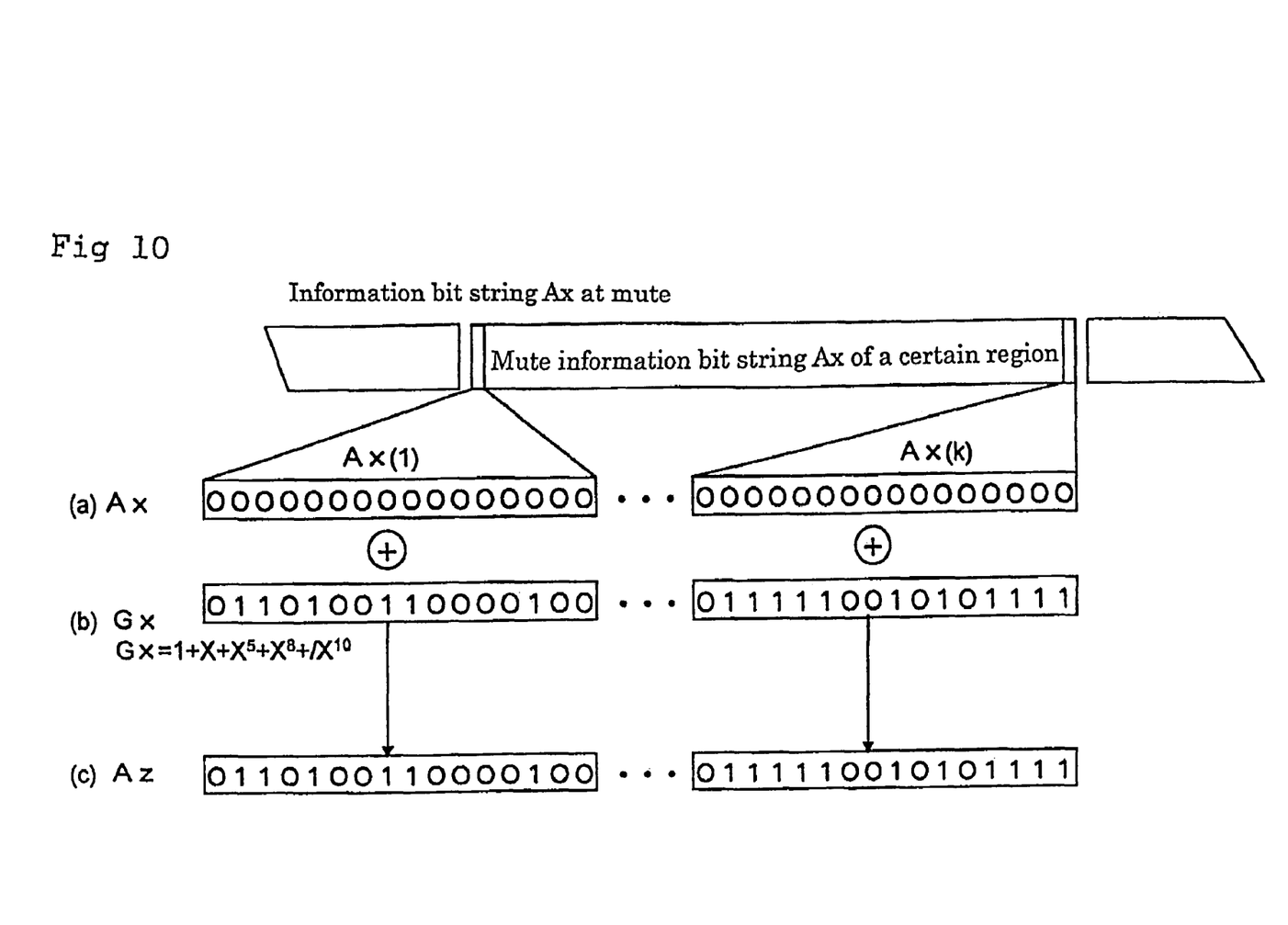
FIG. 10 is an illustration used to describe a conventional scrambling method in an AV system.

Problems in the conventional AV systems with respect to the scrambling are described in the following, referring to FIG. 10 and FIG. 11. Problems mostly occur when the signal is in a very small level or at mute, so description is made using a case at mute as an example. FIG. 10 shows an exemplary scrambling in a conventional AV system, where the input audio signal Ax is mute data. As it is exhibited in the 2S compliment, all of the bits are "0", as shown in FIG. 10(a). Now, think of a method of main scrambling through the bit reversal using a scramble bit string generated through a formula $Gx=1+X+X5+X8+/X10$, for example. FIG. 12 shows an exemplary circuit structure for this case.

The scrambling string is as shown in FIG. 10(b). The scrambled output data Az, FIG. 10(c), has the same bit string as the scrambling bit string. To be noted here is that: the mute audio signal Ax has been scrambled and well dispersed in the emerging probability within each sample unit; however, from the view point of a longer bit string it repeats with a cycle of the original formula, therefore the probability of emergence appears particularly deviated in such a longer cycle.

Figure 11:
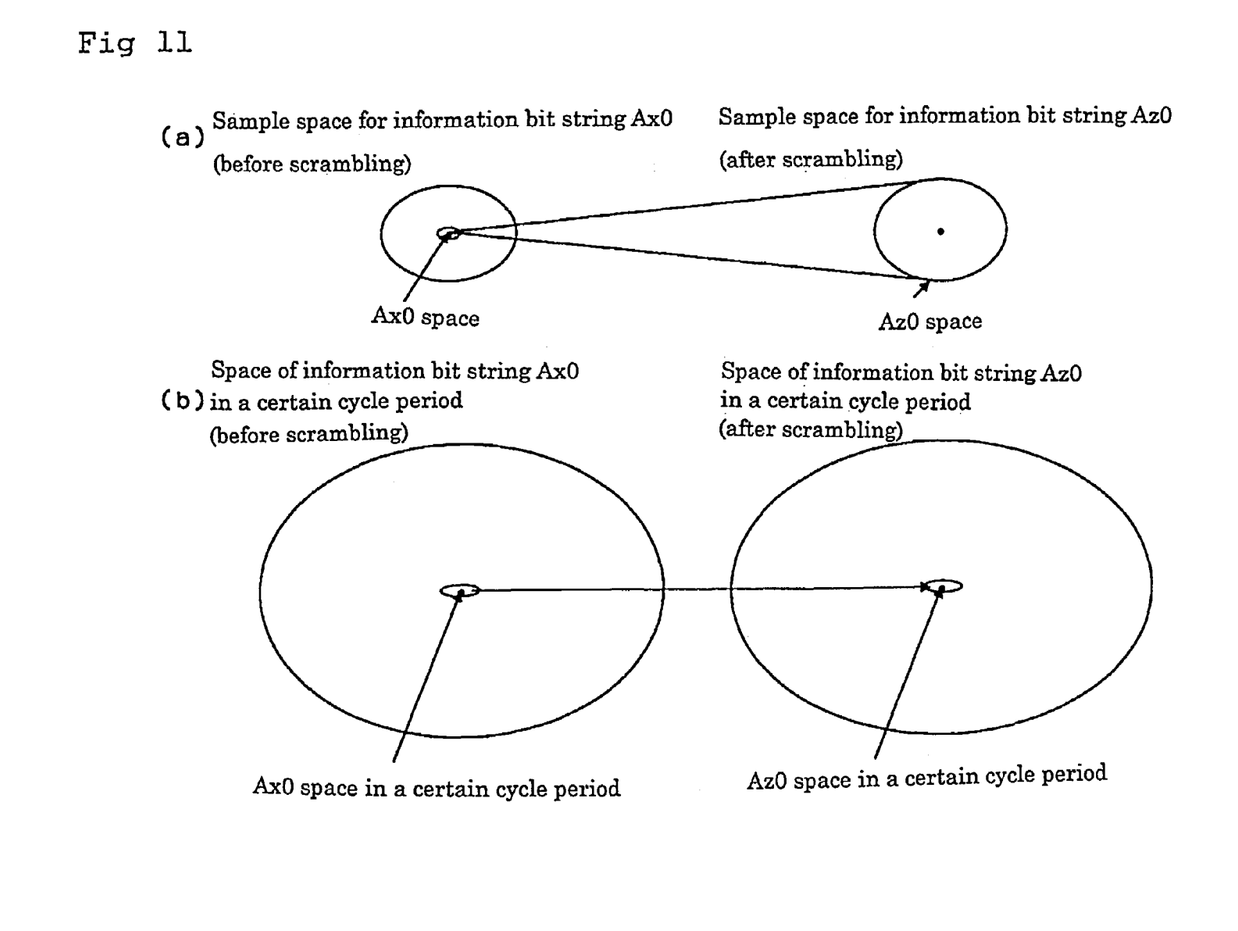
FIG. 11 is an illustration used to describe the concept of scrambling capability in a conventional AV system.
Figure 12:
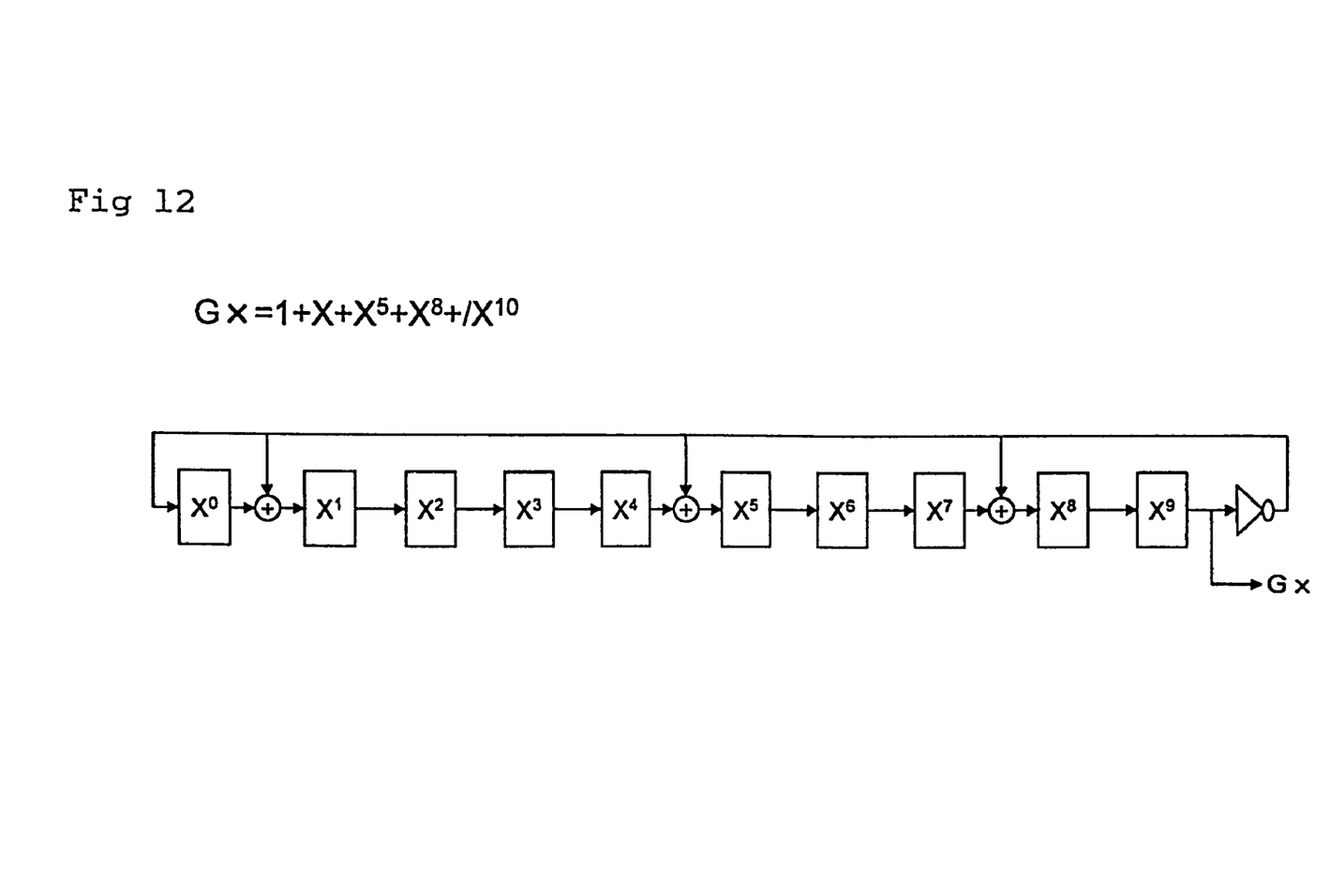
FIG. 12 is a block diagram used to describe a concept of generally-used conventional circuit for generating pseudo random noise.

FIG. 11 is a conceptual illustration of the dispersion of emergence in a congregated space. FIG. 11(a) shows the dispersion within each sample unit. The dispersion appears to have been well dispersed; however, because it is the same as the original formula itself, the space after scrambling is shrinking when viewed with a certain predetermined cycle, as shown in FIG. 11(b). In such a state, co-relationship before and after the scrambling can easily be detected, as a result, the method of scrambling may be readily read. In other words, the degree of scrambling is low.

In the practice, various efforts are being made to safeguard the scrambling method; for example, changing the initial value for each of the frames instead of merely using a formula, using a formula switching from time to time among a plurality of formulae, etc. However, if both of a known input data and the scrambled data observed are available, one can detect and read the scrambling using a computer at a comparative ease.

As described in the foregoing, there are following problems to be solved in the conventional method, in which the scrambling is conducted direct on a linear PCM audio data:

(a) Because the audio signal Ax is a linear PCM audio data, the probability of a certain specific data emerging with respect to a plaintext data in a very low level, or at mute, increases providing a particular deviation. Namely, the redundancy increases and the auto-correlation property will rise.

(b) Therefore, there is a high possibility for the scrambling to be detected; by knowing the state of the audio signal output Ax' as a result of watching, and assuming the audio signal Ax' is a mute data, and then picking up the scrambled audio signal Az' out of the output of separation means 500 for comparison with output data.

(c) Especially in an AV system, where a compressed video data and a linear PCM audio share a common scrambling, the scrambling might well be detected first in the linear PCM audio data, whose degree of scrambling is low, through a co-relationship observed at mute using as a clue, and then in the compressed video data with a chain action, by making use of a method that has then become known.

DISCLOSURE OF THE INVENTION

The present invention addresses the above problems and presents a method, as well as the device, of sub-scrambling/descrambling that is capable of (1) automatically making the probability of emergence well dispersed, through detection of a particular deviation in the probability of emergence of a certain specific data in a very low level or at mute, viz. an increase of the redundancy;

(2) thereby, enhancing the degree of scrambling against an attack that tries to detect and read the scrambling using the redundancy as a clue;

(3) especially in an AV system in which a compressed video data and a linear PCM audio share a common scrambling, effectively safeguarding the scrambling in both the audio and the video signals against an attack that first tries to detect through a clue of co-relationship observed with respect to the linear PCM audio data at mute, and then in a chain action to read the scrambling of compressed video data using the method that has then become known.

For implementing the above objective, the present sub-scrambling/descrambling method, as well as the device, provides a sub-scrambling on a plaintext information bit string X to generate an intermediate information bit string Y, before the plaintext information bit string X is processed by a main scrambling device for producing a scrambled text, or an information bit string Z. The redundancy in information bit string X is detected at each block in terms of the run length, and the redundant run part is replaced with a replacement bit string, preferably with a random data string. The intermediate information bit string Y thus generated is processed by a main scrambling device for producing a scrambled text, or an information bit string Z.

Through the above described procedure, weakness of the scrambling intrinsic to linear PCM audio data is eliminated, and the degree of scrambling is brought to at least the same level, or higher than that, of the conventional method. Detailed description in this point follows.

A sub-scrambling method in accordance with a first mode of the present invention is a method that provides a sub-scrambling on a plaintext information bit string X to generate an intermediate information bit string Y, before it is processed by a main scrambling device for producing a scrambled text, or an information bit string Z. Defining the continuous portion of bit "1" or "0" in a certain part P of an information data, which being a part of information bit string X, as run Rn, the length of said run Rn as Ln, the minimum value of said run length Ln within a certain predetermined region of information data consisting of a certain specific number k as Lmin; the sub-scrambling is conducted in the following way. At every said predetermined region, at least said Lmin is used as annex information Ysub, if said certain part P is not determined yet, then a certain part P is further added to use it as annex information Ysub, in each of the information data within said predetermined region the bit string not exceeding said Lmin at the certain part P is replaced with an arbitrary replacement bit string of the same length to generate an information data, and an information bit string Y is produced out of the information data. The intermediate information bit string Y, which has undergone the sub-scrambling, is processed further by a main scrambling device for producing a scrambled text, or an information bit string Z.

A sub-scrambling device in accordance with a second mode of the present invention comprises a sub-scrambling device for generating an intermediate information bit string Y out of a plaintext information bit string X, as a pre-processing to a main scrambling device which has been provided for producing a scrambled text, or an information bit string Z. Defining the continuous portion of bit "1" or "0" in a certain part P of an information data, which being a part of information bit string X, as run Rn, the length of said run Rn as Ln, the minimum value of said run length Ln within a certain predetermined region of information data consisting of a certain specific number k as Lmin; the sub-scrambling device operates in the following way. At every said predetermined region of said information bit string X, at least said Lmin is used as annex information Ysub, if said certain part P is not determined yet, then a certain part P is further added to use it as annex information Ysub, in each of the information data of information bit string X within said predetermined region the bit string not exceeding said Lmin at the certain part P is replaced with an arbitrary replacement bit string Rnd of the same length to generate an information data, and an information bit string Y is produced out of the information data. The intermediate information bit string Y generated by the sub-scrambling device is further processed by a main scrambling device provided for producing a scrambled text, or an information bit stream Z.

The above method/device eliminates the weak point in the scrambling of linear PCM audio data, and is capable of producing a scrambled text having a degree of scrambling that is identical to, or higher than, that of the conventional method/device. It may be recorded or transmitted safely through the device provided for outputting such scrambled text.

A sub-descrambling method in accordance with a third mode of the present invention is a method that provides a sub-descrambling on an intermediate descrambled text Y' for restoring the original plaintext information data X', after it is processed by a main descrambling device provided for obtaining an intermediate de-scrambled text Y' out of a text transmitted. At every said predetermined region, the sub-descrambling replaces a bit string at a certain part P not exceeding said Lmin in each of the intermediate de-scrambled information data Y' with a continuous bit string Rne of the same length, based on at least one information parameter Lmin and, depending on needs, another parameter P of an annex information, which has been attached to the transmitted text, used for sub-scrambling the text transmitted, to produce an information data. In the end, an information bit string X' is produced out of the information data.

The continuous portion of bit "1" or "0" in a certain part P of an information data constituting information bit string X, or the original plaintext, is defined as run Rn, the length of said run Rn as Ln, the minimum value of said run length Ln within a certain predetermined region of information data consisting of a certain specific number k as Lmin.

A sub-descrambling device in accordance with a fourth mode of the present invention comprises a sub-descrambling device for restoring a plain information bit string X' out of an intermediate descrambled text Y', after a main descrambling which generates the intermediate descrambled text Y' out of a transmitted text. At every said predetermined region, the sub-descrambling replaces a bit string at a certain part P not exceeding said Lmin in each of the intermediate descrambled information data Y' with a continuous bit string Rne of the same length, based on at least one information parameter Lmin and, depending on needs, another parameter P of an annex information, which has been attached to the transmitted data, used for sub-scrambling the text transmitted, to produce an information data. In the end, an information bit string X' is reproduced out of the information data.

The continuous portion of bit "1" or "0" in a certain part P of an information data constituting information bit string X, or the original plaintext, is defined as run Rn, the length of said run Rn as Ln, the minimum value of said run length Ln within a certain predetermined region of information data consisting of a certain specific number k as Lmin.

With the above-described method/device, it is difficult to detect and read a scrambling through a comparison of scrambled text and descrambled text of linear PCM audio data transmitted. Thus, the present invention offers a descrambling method, at the degree of scrambling identical to, or higher than, that of the conventional method/device. The transmitted data may be received safely by the device provided for outputting such descrambled text.

DESCRIPTION OF THE PREFERRED EMBODIMENT

Preferred embodiments of the present invention are described in the following with reference to the drawings.

Embodiment 1

Figure 1:
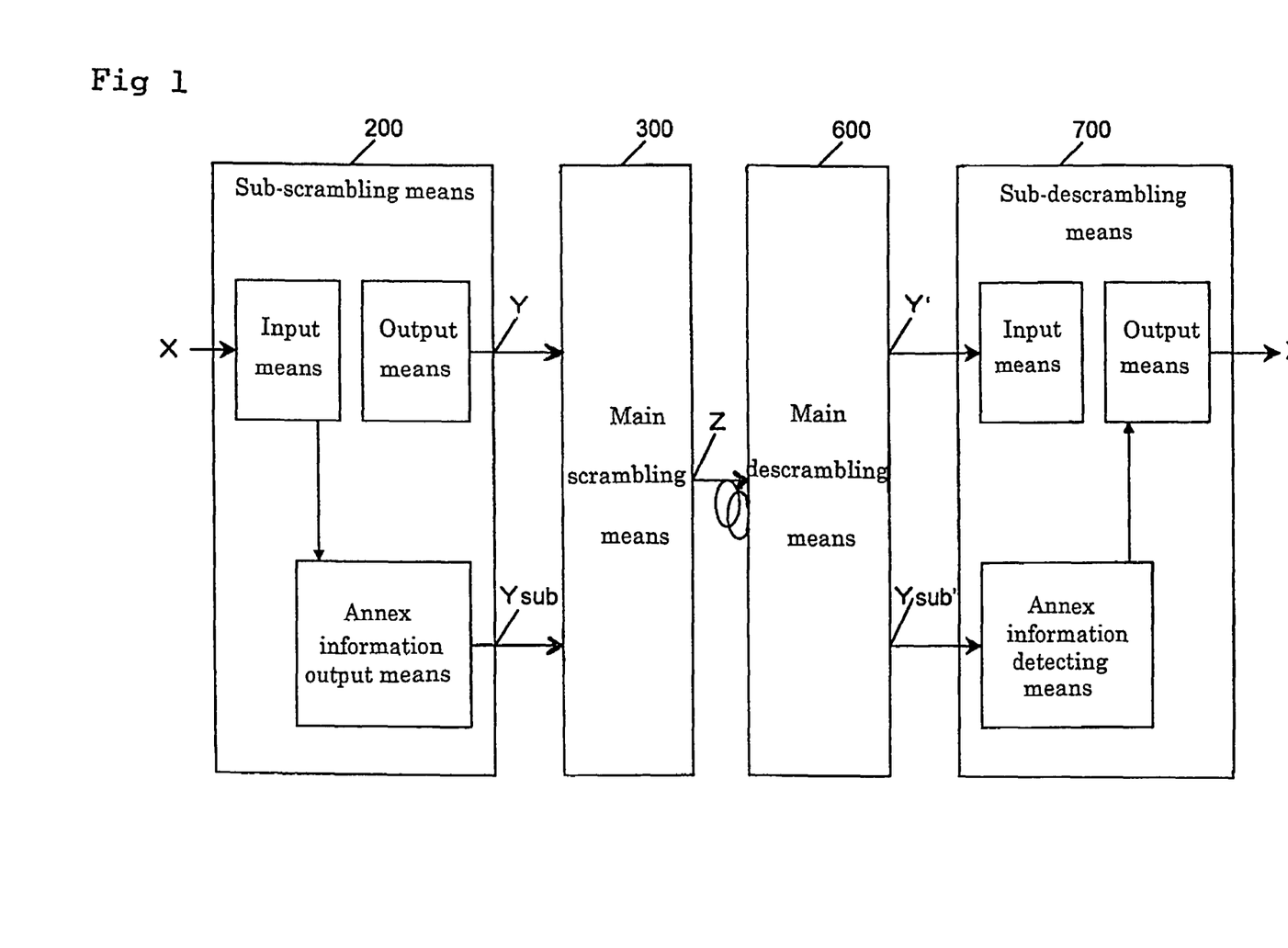
FIG. 1 is a block diagram, showing a sub-scrambling/descrambling method, and the device, in accordance with a first exemplary embodiment of the present invention.

FIG. 1 is a block diagram of a sub-scrambling/descrambling method, and the device, in accordance with a first exemplary embodiment of the present invention.

Referring to FIG. 1, an input signal X is delivered to sub-scrambling means 200. The sub-scrambling means 200 delimits the input signal X for a certain predetermined region, and replaces the redundant run therein with an arbitrary random data; at the same time, takes out a representative value of the redundant run as annex information Ysub. Both, or at least the data of information bit string Y, are delivered to main scrambling means 300 for undergoing main scrambling. The scrambled information bit string Z is sent to a recording medium (not shown), or a transmission channel (not shown explicitly), after having an adaptation to a suitable format if demanded. These are the outline of processing at the scramble side.

Descrambling of information received through a transmission channel is conducted as follows.

Information bit string Z, or input data, undergoes a main descrambling at descrambling means 600 to become information bit string Y'. Together with the information bit string Y', annex information Ysub' is taken out of the descrambling means 600 to be delivered to sub-descrambling means 700. The sub-descrambling means 700 delimits the information bit string Y' for a certain region, and adds a redundant run shown in annex information Ysub' to the information bit string Y'. Information bit string X' thus produced is taken out. The overall picture of data processing, and the relationship between sub-scrambling and descrambling are as described in the above.

Now, the route of processing in the sub-scrambling method, or the device, will be described in detail referring to FIG. 2.

Figure 2:
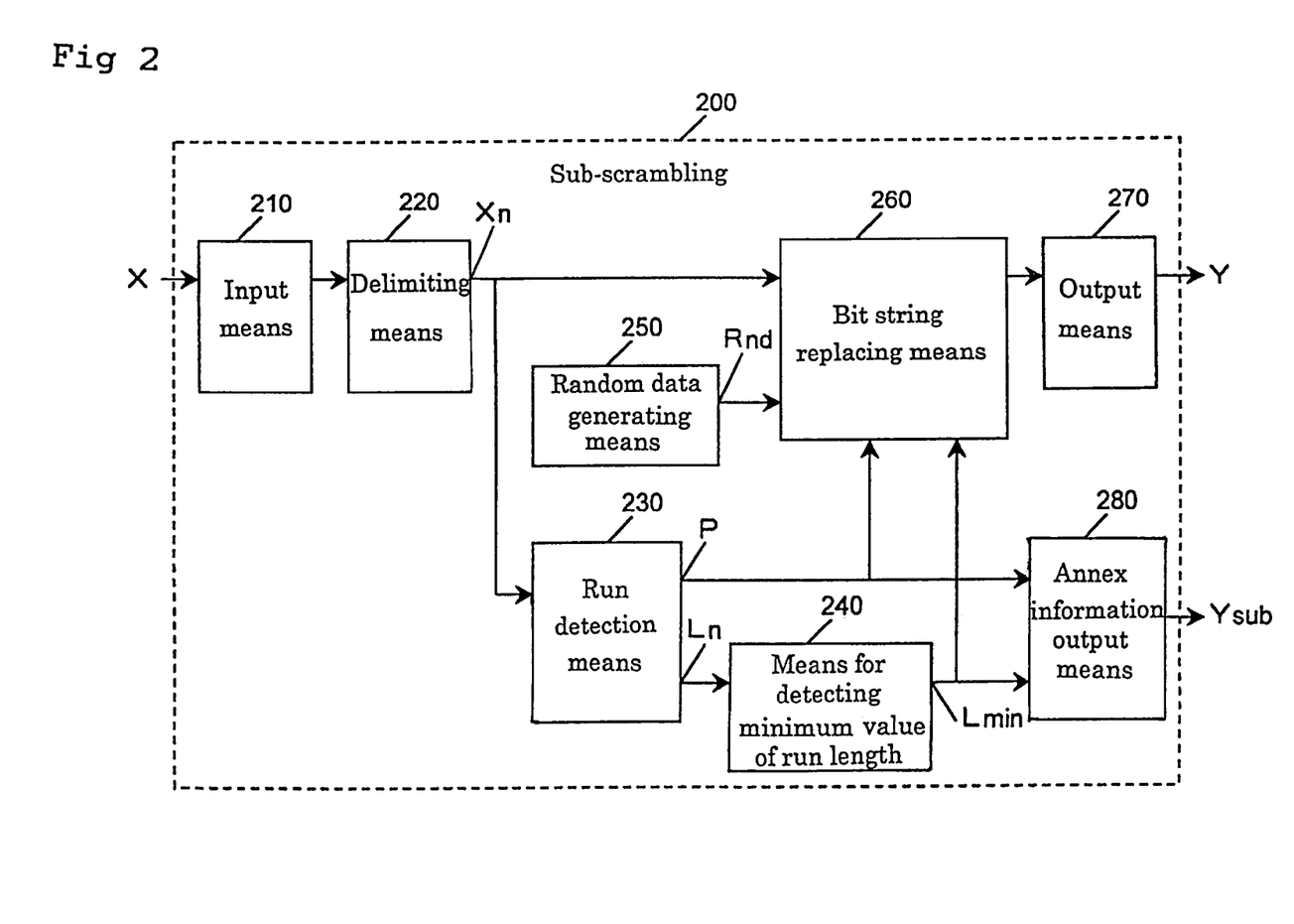
FIG. 2 is a block diagram, showing the processing channel in the sub-scrambling method, or the device.
Figure 6:
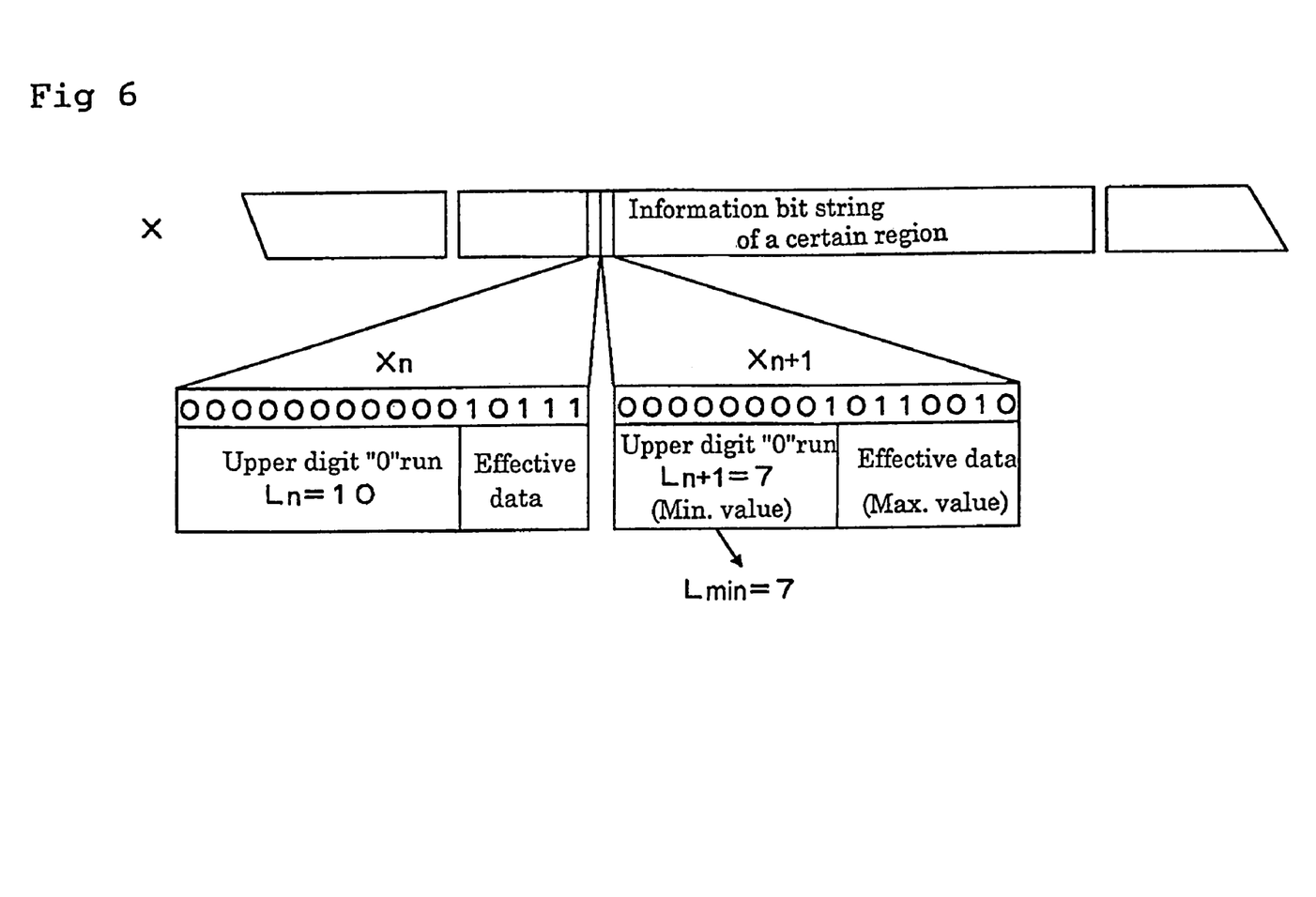
FIG. 6 is an illustration used to describe a sub-scrambling method in accordance with a first exemplary embodiment.

FIG. 2 is a block diagram showing a practical example of the sub-scrambling means. Numeral 210 denotes input means, 220 is delimiting means, 230 is run detection means, 240 is means for detecting minimum value of run length, 250 is random data generation means, 260 is bit string replacing means, 270 is output means, and 280 is annex information output means. In the first place, an information bit string X is delivered to input means 210. The delimiting means 220 delimits the data into frames of a certain predetermined time (500 ms, for example). The frame contains 24,000 pcs of audio data, when the sampling frequency is 48 kHz. These audio data Xn are exhibited in stereo 16-bit data in terms of the 2S compliment. Then, the run detection means 230 detects the run Ln of Xn. FIG. 6 shows practical sample data of Xn and run Ln.

In FIG. 6, Xn="0000000000010111", Xn+1="0000000010110010".

The first bit "0" is the polarity symbol of positive value, and the "0"s following the polarity symbol are called an upper digit run. In the above examples, it is 10 and 7, respectively. A continuation of "0" has been treated as the run in this example; however, a continuation of "1", which represents negative polarity, is also treated likewise. As it is already known that in the 2S compliment run is found at the upper digit bits when the level is very low, the information about P, which indicates a point of run generation, is treated as known, and which is not transmitted. Assuming the maximum value in the absolute value of data within this region is Xn+1, then the minimum value of run length Lmin in the region is 7. When, all the data in the region have at least 7, or more, runs. Description follows referring again to FIG. 2.

The Lmin obtained at the means for detecting minimum value of run length 240 is delivered to the bit string replacing means 260, at the same time it is taken out as annex information Ysub through the annex information output means 280. At the bit string replacing means 260, the run contained in all the audio data in common is replaced with random data string Rnd generated at random data generating means 250, and delivered to the output means 270. The random data generating means 250 may generate any arbitrary random data; for example, providing different data for respective samples, or changing the initial value one after another in a pseudo random data, etc. However, it should preferably be such random numbers any other person can not perceive, which random numbers may be generated by adding natural phenomenon parameter like a lapse time after switching-on of an equipment, for example, as randomizing means. This is advantageous because it enhances the degree of scrambling. Namely, as the random data is not for reproduction, totally arbitrary natural random numbers may be used.

As the upper digit run of the original information bit string X has been replaced with totally meaningless random data bit string in the information bit string Y thus generated, the run part does not continue in any situations whether it is at mute, very low level, middle level or high level. The particular deviation of data is well dispersed, and it is of irreversible nature. Therefore, the degree of scrambling is enhanced in itself. The replacement bit string Rnd may be generated using a bit string which has been pre-calculated to provide a substantially well dispersed emergence of bit "0" and bit "1" in an information data after replacement; in this way the emergence of "0" and "1" can eventually be made better dispersed. The information bit string Y thus generated undergoes the main scrambling to obtain principal degree of scrambling. When, the deviation in input data is totally eliminated; therefore, it can defend an attack on main scrambling, and the degree of scrambling is further enhanced by the combined effects of sub-scrambling and main scrambling.

Figure 3:
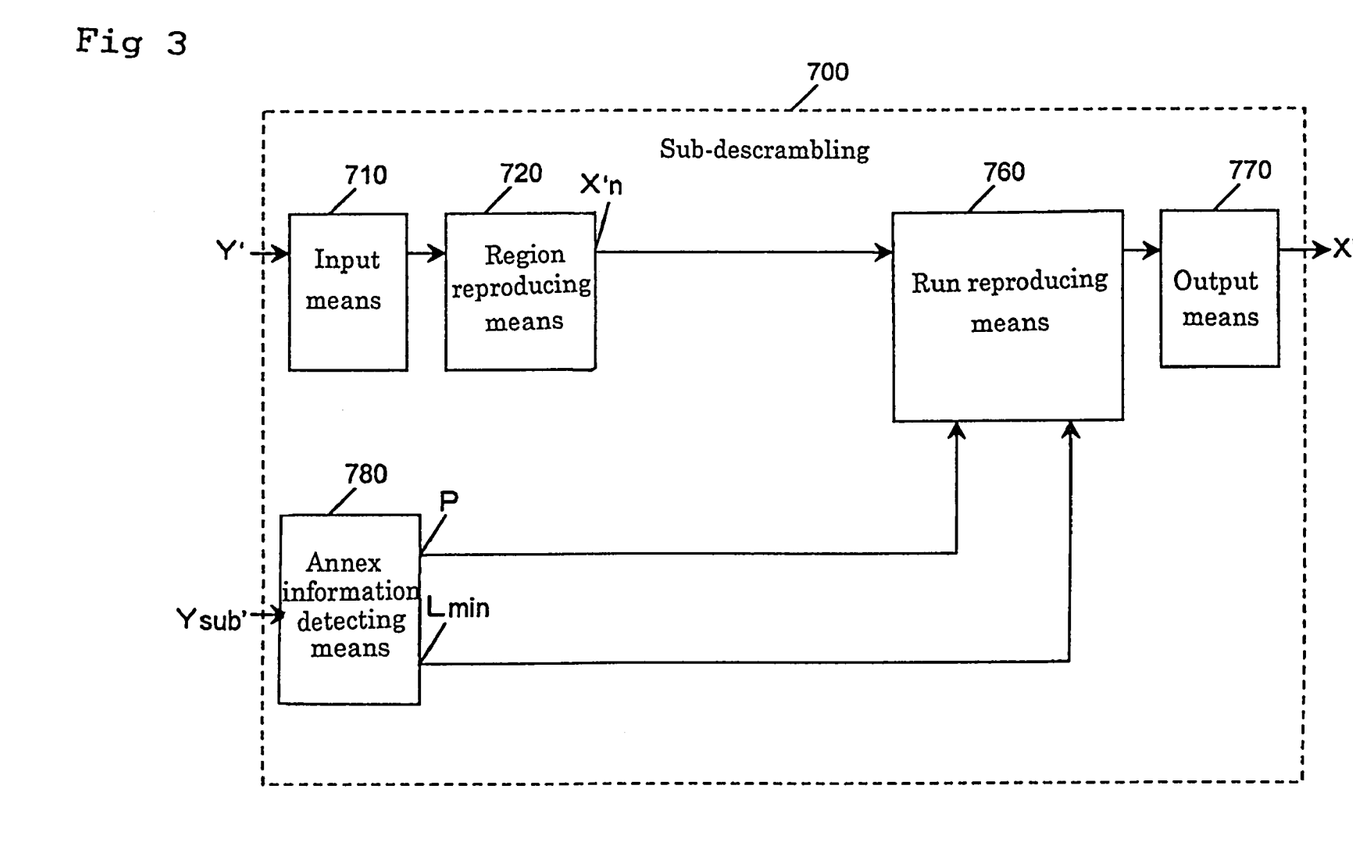
FIG. 3 is a block diagram, showing the processing channel in the sub-descrambling method, or the device.

FIG. 3 is a block diagram showing the processing route, or device, of sub-descrambling.

The information bit string Y' delivered from the main descrambling means 600 (FIG. 1) is equivalent to the information bit string Y (FIG. 2). The information bit string Y' is delivered to input means 710, and is frame-synchronized at each 500 ms, for example, in region reproducing means 720. The annex information Ysub', which is equivalent to the annex information Ysub of FIG. 2, also comes from the main descrambling means 600, and is delivered to sub-descrambling means 700. In the sub-descrambling means 700, the minimum value Lmin of run length is reproduced at annex information detecting means 780. Although in FIG. 3 the run positional information P is also illustrated for undergoing the reproduction, because it is exhibited in the 2S compliment as described earlier and the P is an already-known factor there, the already-known P does not need to be transmitted. The audio data X'n and the run length minimum value Lmin thus obtained are delivered to run reproducing means 760. The run reproducing means 760 replaces a bit string, corresponding to the length of run length minimum value Lmin in the upper digit bit of audio data X'n excluding the polarity bit, with "0" or "1" for the same length. Whether it should be "0" or "1" depends on the polarity bit. In case of the 2S compliment, it is the same polarity as the polarity bit, whereas it is the reverse polarity in the case of offset binary. The audio data X' thus reproduced with the run is taken out via output means 770.

As described in the foregoing, the audio data X is split into run part and the rest in the sub-scrambling in accordance with the present exemplary embodiment. The run part is exhibited in the annex information Ysub, while the run part itself is replaced with random data that is totally irrelevant. It is transmitted after undergoing the main scrambling, and the reproduction procedure is conducted by first applying the main descrambling and then the upper digit run is restored in the audio data using the annex information Ysub. Run part of audio data at mute or very low level is eliminated by a pretreatment before it undergoes the main scrambling. As the result, the dependability against an attack to the main scrambling is improved, and the degree of sub-scrambling itself is also enhanced by the use of natural random numbers for the run replacement data. Thus the degree of scrambling is enhanced by mutual effects to each other.

The sub-descrambling in accordance with the present exemplary embodiment can be safely descrambled, while it has least possibility of detection that might be conducted during descrambling process, or the device. Thus a high degree scrambling is offered.

Embodiment 2

Figure 4:
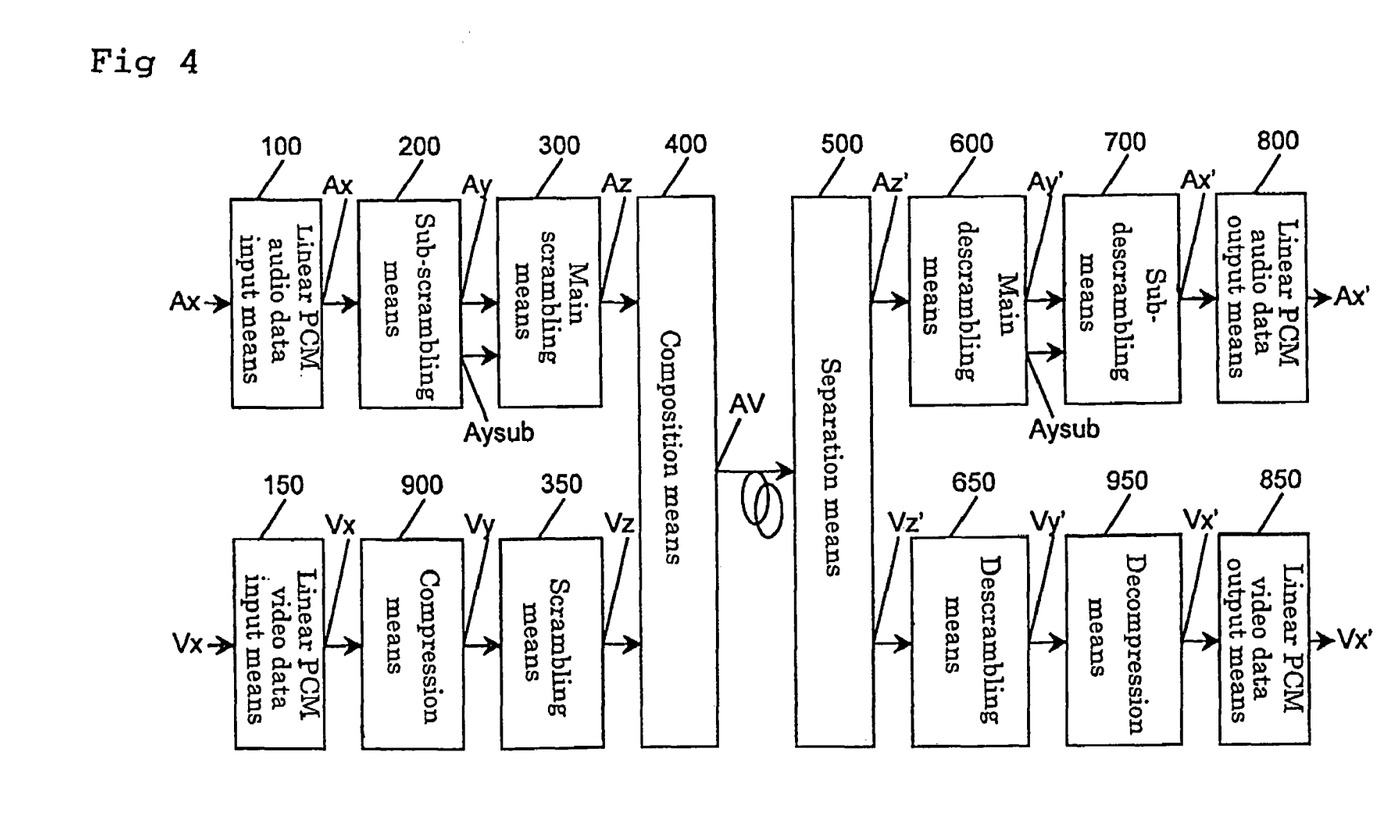
FIG. 4 and FIG. 5 are block diagrams showing a sub-scrambling/descrambling method, or the device, incorporated in an AV system, in accordance with a second exemplary embodiment of the present invention.
Figure 5:
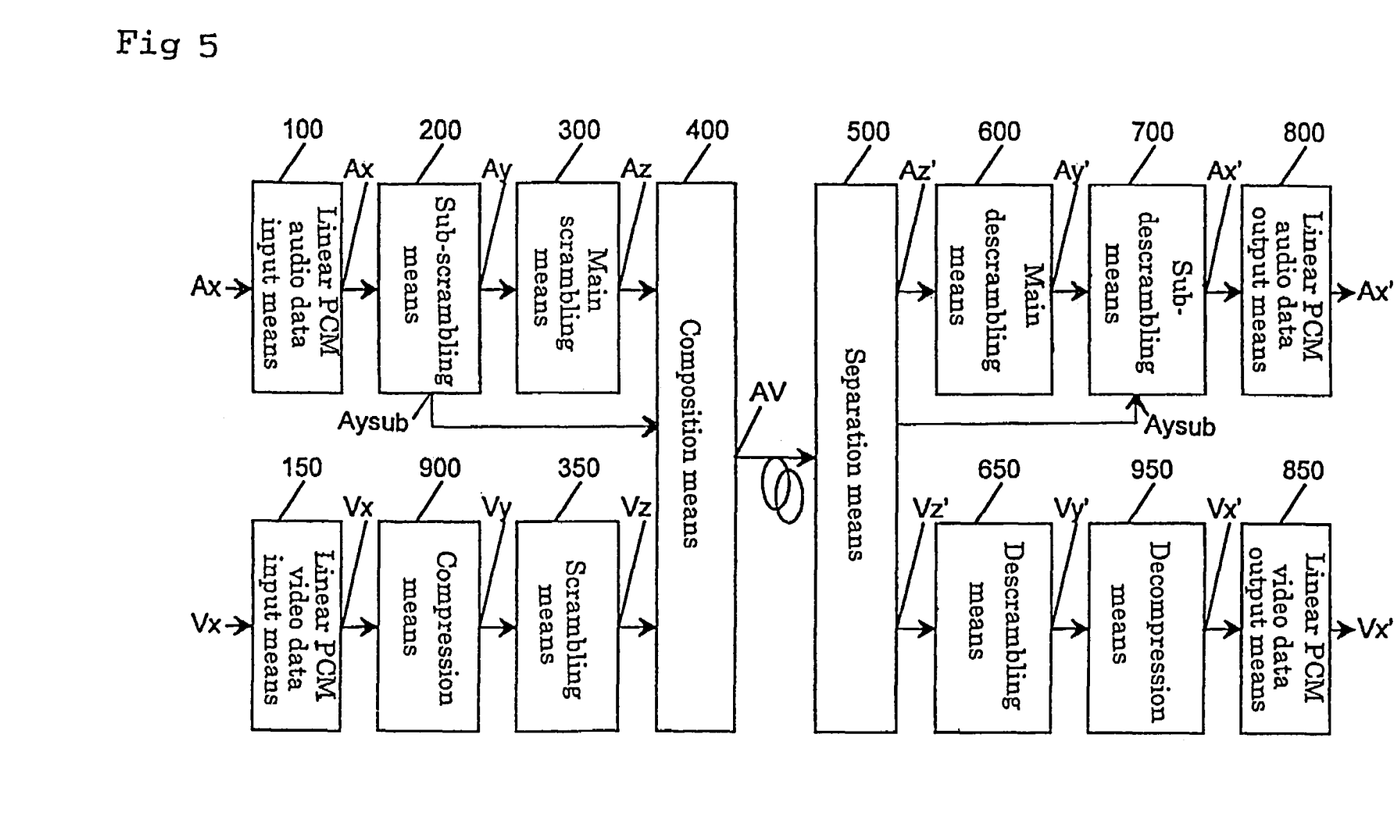

As a second exemplary embodiment, a sub-scrambling/descrambling device in accordance with the present invention is incorporated in an AV system. Both FIG. 4 and FIG. 5 are block diagrams showing the sub-scrambling/descrambling method, and the device, incorporated in an AV system. Those means having the same function as those of the conventional device shown in FIG. 9 are represented by using the same symbols, and description on the common operation is omitted here.

The point of difference as compared with FIG. 9 is that a sub-scrambling/descrambling device of the present invention has been incorporated in the audio data system. Difference between FIG. 4 and FIG. 5 is seen in the handling of audio annex information Aysub; in FIG. 5 the audio annex information Aysub is delivered for transmission without it undergoing main scrambling, whereas in FIG. 4 the audio annex information Aysub is split from the audio data and it further undergoes a main scrambling before it is transmitted. Processing is simple in the former configuration, while in the latter the audio annex information Aysub is also provided with a certain degree of scrambling.

Applying the present sub-scrambling enables even a linear PCM audio data to have a scrambling that has been enhanced to a level comparable to, or higher than, that of a compressed video data. Therefore, in an AV system in which a compressed video data and a linear PCM audio data share a common scrambling, it is well safeguarded against an attack that tries first to detect the scrambling of the linear PCM audio data using a correlationship at mute as a clue, and then detect the scrambling of compressed video data using a method then became known; eventually detecting and reading the both scrambles in a chain action.

Embodiment 3

It may be combined with error correcting means. This is described as a third exemplary embodiment.

Figure 7:
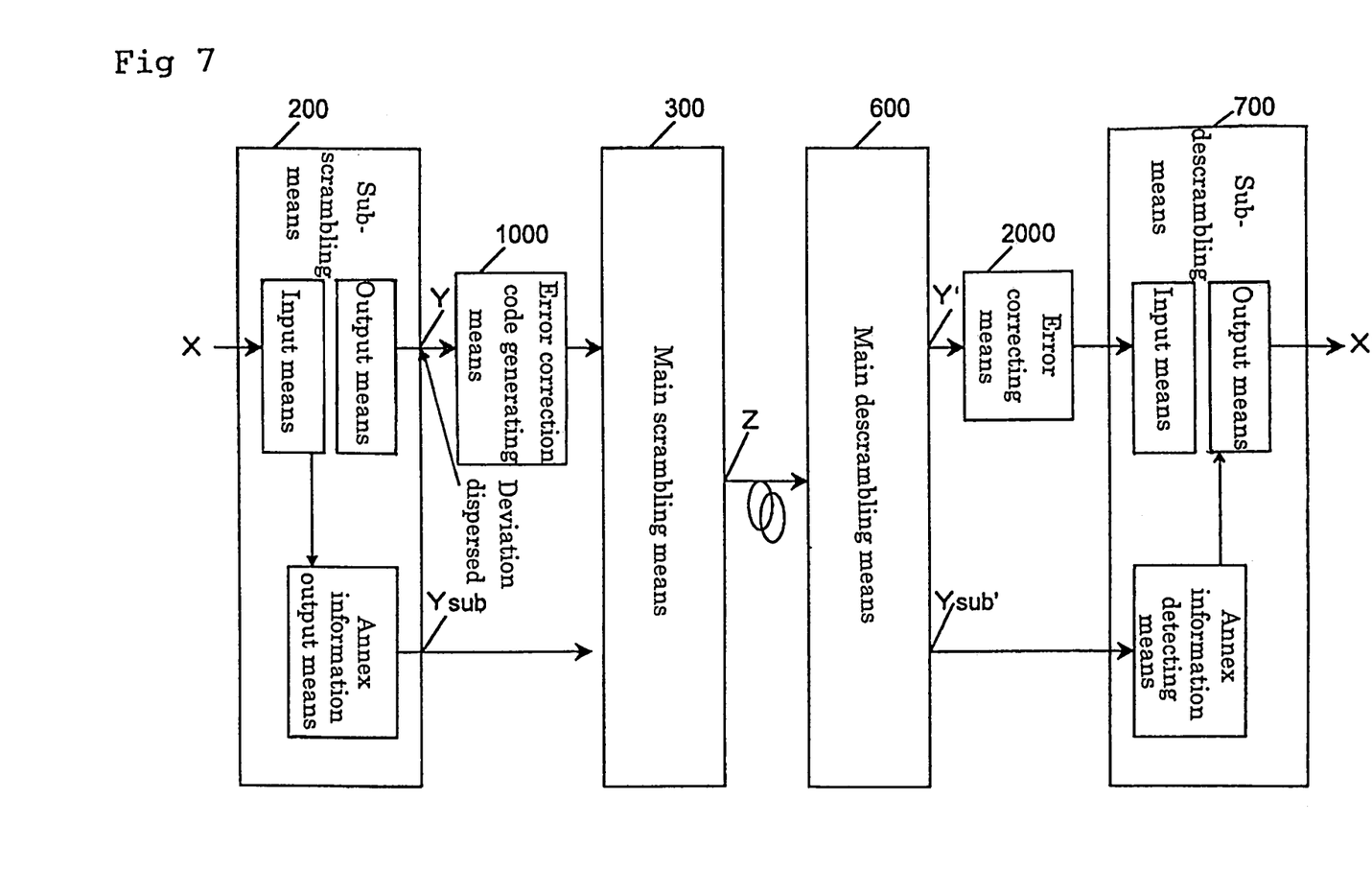
FIG. 7 is a block diagram of a sub-scrambling/descrambling method, and the device, in accordance with a third exemplary embodiment of the present invention.

FIG. 7 shows block diagram of a structure, in which the sub-scrambling and error correcting means are incorporated for creating their composite effects. Those means having the same function as those of FIG. 1 are represented with the same symbols. In FIG. 7, numeral 1000 denotes error correction code generating means, which is provided after the sub-scrambling means. The reason why the above structure is formed is that: If a particular deviation is produced in audio data while it is at mute, or in other such state, the error correcting capability might deteriorate due to concentration of data to a singular point of error correction. The present embodiment aims to prevent the occurrence of such a situation. Further undergoing the main scrambling means 300 assures the degree of scrambling as it is. The scrambling means 300 may be eliminated if such degree of scrambling is not required. Identical effects may be obtained by using other methods; conversion to a partial response code or a Viterbi code, an EFM modulation that makes it easy to pull in on a PLL through elimination of DC component, an 8-10 modulation, etc.

Embodiment 4

Figure 8:
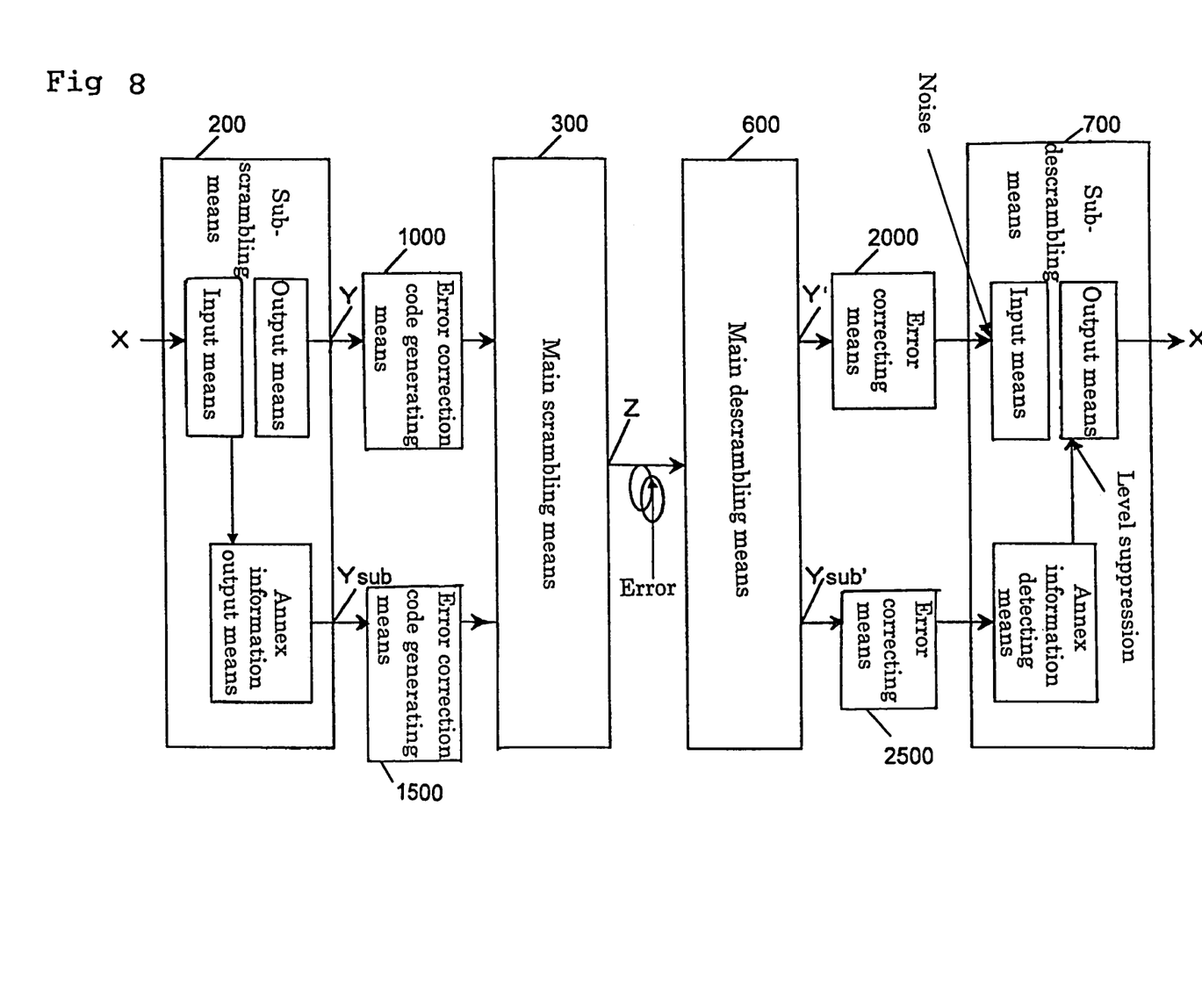
FIG. 8 is a block diagram of a sub-scrambling/descrambling method, and the device, in accordance with a fourth exemplary embodiment of the present invention.

FIG. 8 shows another configuration, in which the error correction code is applied likewise on the annex information Ysub. This is described as a fourth exemplary embodiment of the present invention.

In the same manner as in FIG. 7, the same means carry the same symbol of FIG. 1. In FIG. 8, numeral 1500 denotes error correction code generating means for the annex information Ysub. For the purpose of raising the reliability of the annex information Ysub, the error correcting capability of a code of the error correction code generating means 1500 provided for the annex information Ysub is set to be higher than that of the error correction code generating means 1000 provided for audio data. In the same notion, capability of the error correcting means 2500 provided for annex information Ysub', in the descrambling end, or the receiving end, is set to be higher than that of error correcting means 2000 provided for audio data. By so doing, the reliability of annex information Ysub' becomes higher in relation to that of audio data.

Suppose an error is generated during transmission and that is beyond error correction capability of the error correcting means 2000 provided for audio data, the error data is outputted and a big noise might be produced to an almost full scale even it is at mute, or very low level. However, because the error correcting means 2500 provided for the annex information Ysub' has a higher capability than that of error correcting means 2000 provided for the audio data, a correct annex information is obtained. As the result, level of the noise is suppressed and generation of abnormal sound can be avoided. When it is at mute, the noise is also muted. As described in the above, a sub-scrambling/descrambling method, as well as the device, in accordance with the present invention may be provided also with an error correcting capability and a noise suppression capability against a possible error generation.

INDUSTRIAL APPLICABILITY

A sub-scrambling/descrambling method, and the device, having the following features is offered in accordance with the present invention:

(1) By detecting a particular deviation in the emerging probability of a certain specific data in a very low level, or at mute, namely, an increase in the redundancy, it automatically makes the probability of emergence well dispersed.

(2) Thereby, the degree scrambling is enhanced against an attack that tries to detect and read the scrambling with the redundancy used as a clue.

(3) Especially in an AV system in which a compressed video data and a linear PCM audio share a common scrambling, it can be effectively safeguarded against an attack that tries to first detect and read the scrambling of the linear PCM audio data by using a correlationship at mute as a clue, and then read the scrambling of compressed video data using the method which then became known; eventually detecting and reading the both scrambles in a chain action.

Additionally incorporating error correction means enables to suppress the noise level and prevent generation of abnormal sound, even in a case where an error is generated during transmission exceeding the capability of error correction at the error correcting means which has been provided for the audio data. If it is during muting, the noise is also muted. A sub-scrambling/descrambling method, as well as the device, in accordance with the present invention may be provided also with an error correcting capability and a noise suppression capability against a possible error generation.

As described in the foregoing, the present invention offers a scrambling device with which the degree of scrambling with linear PCM audio data, which harbored substantial problems, is enhanced, and that can be easily applied in various AV systems, providing a well-balanced degree of scrambling. The scrambling device can be offered economically on a stable basis.

REFERENCE NUMERALS

| | |
|---|---|
| 100 | Linear PCM audio data input means |
| 200 | Sub-scrambling means |
| 220 | Delimiting means |
| 230 | Run detection means |
| 240 | Means for detecting minimum value of run length |
| 250 | Random data generating means |
| 260 | Bit string replacing means |
| 280 | Annex information output means |
| 720 | Region reproducing means |
| 760 | Run reproducing means |
| 300 | Main scrambling means |
| 400 | Composition means |
| 500 | Separation means |
| 600 | Main descrambling means |
| 700 | Sub-descrambling means |
| 800 | Linear PCM audio data output means |

The invention claimed is:

1. A sub-scrambling method for generating an intermediate information bit string Y and an annex information Ysub out of plaintext information bit sting X prior to a main scrambling that produces a scrambled information bit string Z, comprising:

supplying an input information data signal comprising an information bit string X to a sub-scrambling module of a data processing device;

defining a continuous portion of bit "1" or bit "0" following a polarity symbol in upper digit bits of the information bit string X as run Rn using a run detector module of said sub-scrambling module, wherein the length of said run Rn is defined as Ln, and wherein the minimum value of said run length Ln, within a certain predetermined region of information data consisting of a certain specific number k, is defined as Lmin using a minimum value detector module of said sub-scrambling module of said data processing device;

generating annex information Ysub with an annex information output of said sub-scrambling module, wherein, in every said predetermined region of said information bit string X, at least said Lmin is used as annex information Ysub, wherein, in the respective information data of information bit string X within said predetermined region, the bit string of said Lmin at said run Rn is replaced with an arbitrary replacement bit string Rnd of the same length to generate an intermediary information data with a bit string replacement module of said sub-scrambling module of said data processing device; and wherein an intermediate information bit string Y is produced out of the information data by the sub-scrambling module of said data processing device.

2. The sub-scrambling method of claim 1, wherein the plaintext information bit string X comprising data exhibited in the 2S compliment or offset binary format.

3. The sub-scrambling method of claim 1 or claim 2, wherein the replacement bit string Rnd is generated at least in the information data consisted of a certain specific number k using pseudo random numbers.

4. The sub-scrambling method of claim 1 or claim 2, wherein the replacement bit string Rnd is generated by using a bit string with which it has been precalculated so that the probability of emergence of "0" and "1" in the information data after replacement is well dispersed to be substantially flat.

5. The sub-scrambling method of claim 1 or claim 2, wherein the replacement bit string Rnd is generated by using at least random numbers with which it has been precalculated so that the probability of emergence of data in the information data consisted of a certain specific number k is well dispersed to be substantially flat.

6. The sub-scrambling method of claim 1 or claim 2, wherein error correction code is generated to be added on after the sub-scrambling process, which sub-scrambling process has been provided for generating intermediate information bit string Y out of plaintext information bit string X, and then the main scrambling is applied thereon.

7. A sub-scrambling device for generating an intermediate information bit string Y and annex information Ysub out of a plaintext information bit string X, as a pre-processing to a main scrambling device that has been provided for producing a scrambled text, or an information bit string Z, comprising:
   an input device that inputs an information data signal including the bit string X;
   a run detection device that defines a continuous portion of bit "1" or bit "0" following a polarity symbol in upper digit bits of information bit string X input by the input device as run Rn, wherein the length of said run Rn is defined as Ln;
   a minimum value detector that detects the minimum value of said run length Ln defined by the run detection device within a certain predetermined region of information data consisting of certain specific number k defined as Lmin;
   an annex information output device that outputs annex information Ysub, wherein, in every said predetermined region of said information bit string X, at least said Lmin is used as annex information Ysub;
   a bit string replacement device that generates an arbitrary replacement bit string Rnd, wherein in the respective information data of information bit string X within said predetermined region, the bit string of said Lmin at said run Rn is replaced with the arbitrary replacement bit string Rnd of the same length to generate an intermediary information data; and
   an output device that produces an intermediate information bit string Y out of the information data.

8. The sub-scrambling device of claim 7, wherein the plaintext information bit string X comprising data exhibited in the 2S compliment or offset binary format.

9. The sub-scrambling device of claim 7 or claim 8, wherein the replacement bit string Rnd is generated at least in the information data consisted of a certain specific number k using pseudo random numbers.

10. The sub-scrambling device of claim 7 or claim 8, wherein the replacement bit string Rnd is generated by using a bit string with which it has been precalculated so that the probability of emergence of "0" and "1" in the information data after replacement is well dispersed to be substantially flat.

11. The sub-scrambling device of claim 7 or claim 8, wherein the replacement bit string Rnd is generated by using at least random numbers with which it has been precalculated so that the probability of emergence of data in the information data consisted of a certain specific number k is well dispersed to be substantially flat.

12. The sub-scrambling device of claim 7 or claim 8, wherein error correction code is generated to be added on after the sub-scrambling process, which sub-scrambling process has been provided for generating intermediate information bit string Y out of plaintext information bit string X, and then the main scrambling is applied thereon.

13. A sub-descrambling method for restoring the original plaintext information bit string X' out of intermediate descrambled text Y' and annex information Ysub' after it is processed by a main descrambling device that has been provided for obtaining an intermediate descrambled text Y' out of a text transmitted, comprising:
   supplying the intermediate descrambled text Y' and annex information Ysub' to a sub-descrambling module of a data processing device;
   defining a continuous portion of bit "1" or bit "0" following a polarity symbol in upper digit bits of an information data constituting information bit string X, or the original plaintext, as run Rn, wherein the length of said run Rn is defined as Ln, and wherein the minimum value of said run length Ln, within a certain predetermined region of information data consisting of a certain specific number k, is defined as Lmin using a region reproducing module and an annex information detecting module of said sub-descrambling module of said data processing device;
   wherein, in every said predetermined region of said information bit string of said Lmin following the polarity symbol in the upper digit bits of the respective information data Y' is replaced with a continuous bit string Rne of the same length to generate an information data, based on at least one information parameter Lmin used in sub-scrambling the text obtained from the annex information Ysub' accompanied by the text transmitted with a run reproducing module of said sub-descrambling module; and
   producing information bit string X' with said data processing device.

14. The sub-descrambling method of claim 13, wherein the plaintext information bit string X comprising data exhibited in the 2S compliment or offset binary format.

15. The sub-descrambling method of claim 14, wherein the continuous bit string Rne is, in a case where plaintext information bit string X is consisting of data exhibited in the 2S compliment, a continuous string of bits having the same polarity as the polarity bit.

16. The sub-descrambling method of claim 14, wherein the continuous bit string Rne is, in a case where plaintext information bit string X is consisting of data exhibited in the offset binary format, a continuous string of bits having the reversed polarity of the polarity bit.

17. A sub-descrambling device for restoring the original plaintext information bit string X' out of intermediate descrambled text Y' and annex information Ysub' after a transmitted text is processed by a main descrambling device that has been provided for obtaining an intermediate descrambled Y' out of a text transmitted, comprising:
   a defining device that defines a continuous portion of bit "1" or bit "0" following a polarity symbol in upper digit bits of information bit string X, or the original plaintext, as run Rn, wherein the length of said run Rn is defined as Ln, and wherein the minimum value of said run length Ln within a certain predetermined region of information data consisting of a certain specific number k is defined as Lmin;

wherein, in every said predetermined region, a bit string of said Lmin of the respective information data of intermediate descrambled information data Y' following a polarity symbol in upper digit bits is replaced with a continuous bit string Rne of the same length to generate an information data, based on at least one information parameter Lmin used in sub-scrambling the text obtained from annex information Ysub' accompanied by the text transmitted; and an output device that produces information bit string X'.

18. The sub-descrambling device of claim 17, wherein the plaintext information bit string X comprising data exhibited in the 2S compliment or offset binary format.

19. The sub-descrambling device of claim 18, wherein the continuous bit string Rne is, in a case where plaintext information bit string X is consisting of data exhibited in the 2S compliment, a continuous string of bits having the same polarity as the polarity bit.

20. The sub-descrambling device of claim 18, wherein the continuous bit string Rne is, in a case where plaintext information bit string X is consisting of data exhibited in the offset binary format, a continuous string of bits having the reversed polarity of the polarity bit.

* * * * *